July 5, 1960  M. H. KLAUSMANN ET AL  2,943,769
COMBINED CONTAINER AND MEASURING SPOUT
Filed March 15, 1957  2 Sheets-Sheet 1

INVENTORS:
Milton H. Klausmann
Henry J. Brucker
Raymond P. Von Cutin
BY
Harry B. Cook
ATTORNEY July 5, 1960  M. H. KLAUSMANN ET AL  2,943,769
COMBINED CONTAINER AND MEASURING SPOUT
Filed March 15, 1957  2 Sheets-Sheet 2

INVENTORS:
Milton H. Klausmann
Henry J. Brucker,
Raymond P. Von Culin
BY
Harry B. Rook,
ATTORNEY

United States Patent Office 2,943,769
Patented July 5, 1960

2,943,769

COMBINED CONTAINER AND MEASURING SPOUT

Milton H. Klausmann, Summit, Henry J. Brucker, Springfield, and Raymond P. Von Culin, Far Hills, N.J., assignors to Seal-Spout Corporation, a corporation of New Jersey Filed Mar. 15, 1957, Ser. No. 646,341

2 Claims. (Cl. 222—364)

This invention relates to a combination of a container and a measuring spout of the type wherein one wall of the container has a discharge aperture and a spout hingedly connected to said wall for swinging movement to close the aperture or to open the same so that measured quantities of the contents of the container, such as comminuted or granular substances may be discharged through said aperture by said spout.

A prime object of the invention is to provide a novel and improved combination of a container and measuring spout which shall be simple and relatively inexpensive and which shall provide for easy and rapid insertion of the spout into the discharge aperture of the container.

Another object is to provide a novel and improved combination of a container and a measuring spout wherein the portion of the wall of the container that is displaced to form the discharge aperture shall be utilized as a part of the measuring spout.

Still another object of the invention is to provide such a combination of a container and a spout wherein the spout may be easily, quickly and selectively adapted for either pouring the contents of the container through the discharge aperture in a continuous stream or for discharging the container contents in measured quantities.

Other objects, advantages and results of the invention will be brought out by the following description in conjunction with the accompanying drawings in which.

Figure 1:
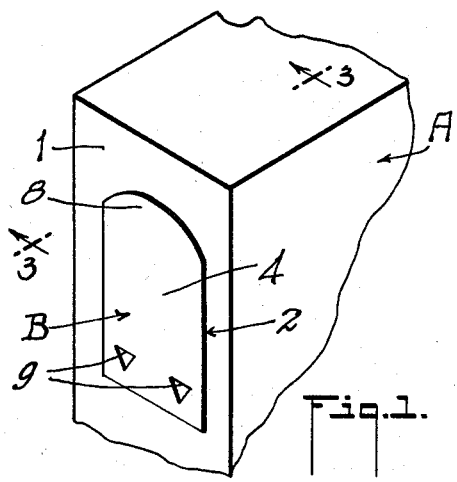
Figure 1 is a fragmentary perspective view of a combined container and measuring spout embodying the invention, illustrating the spout in closed position.

For the purpose of illustrating the principles of the invention, we have shown it in connection with a container and pouring spout of the general type shown in Patent No. 2,011,434, dated August 13, 1955, but it should be understood that the invention may be embodied in other types of containers and spouts.

Specifically describing the illustrated embodiment of the invention, the reference character A designates the body portion of a container which is formed of any suitable material such as cardboard, fiberboard or the like and has one wall, preferably although not necessarily, a side wall 1 provided with a substantially rectangular discharge aperture 2 and a correspondingly shaped tongue 3 integrally connected with said wall at one end of said aperture as indicated at 3' for hinging movement into and out of the aperture for a purpose to be described.

Figure 3:
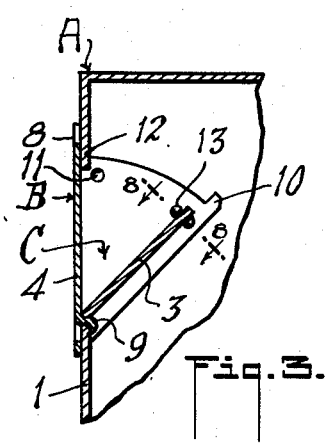
Figure 3 is a fragmentary vertical sectional view approximately on the plane of the line 3—3 of Figure 1.

Cooperating with the container A is a pouring spout B connected to the wall 1 at one end of the opening so as to overlie and close said opening when in one position and to uncover or open said opening when in another position. The spout is preferably formed of thin sheet metal bent upon itself to form a flat body portion 4 and sector shaped side walls 5 at the side edges of said body portion that have arcuate outer edges 6 concentric with the axis of swinging of the spout. The spout is of the same width as the aperture or opening 2 so as to frictionally engage the outer faces of the side walls 5 with the side edges of the aperture, and the body portion 4 has an extension 8 beyond the corresponding end of the aperture for a purpose to be explained. The spout may be hingedly connected to the wall in any suitable manner, but as shown, a pair of prongs or teeth 9 project from the body portion 4 through the tongue 3 adjacent the hinge point 3' thereof and are bent or clinched so as to permit swinging movement of the spout and tongue and at the same time prevent the spout from being pulled out of the discharge aperture or opening 2. As usual, the outer ends of the side walls or wings 5 are provided with lugs 10 to engage the inside of the wall 1 for preventing swinging movement of the spout outwardly of the opening, the extension 8 limiting movement of the spout in the other direction. Also preferably the wings 5 are provided with outwardly projecting protuberances 11 to engage the inner side of the wall 1 when the spout is closed as shown in Figure 3, to releasably hold the spout in closed position.

Figure 2:
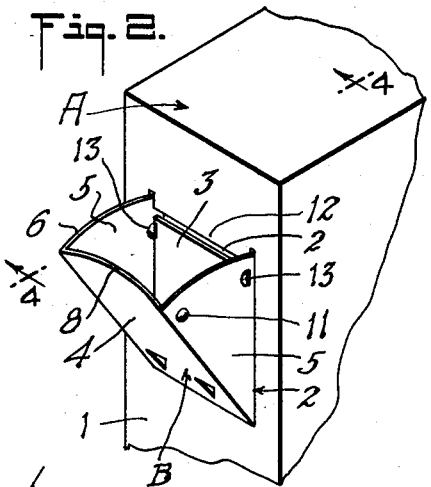
Figure 2 is a similar view showing the spout in open position for the discharge of a measured quantity of the container contents.
Figure 4:
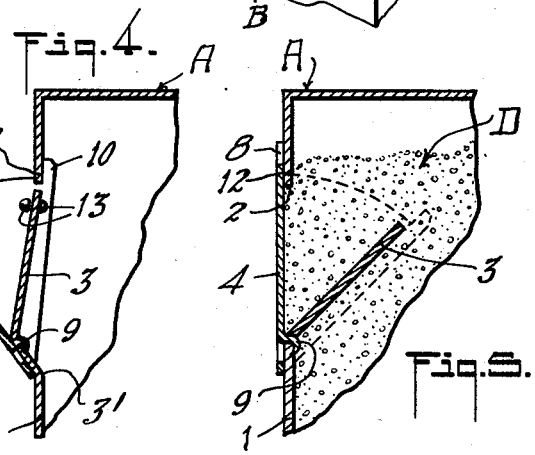
Figure 4 is a similar view on the plane of the line 4—4 of Figure 2.
Figure 5:
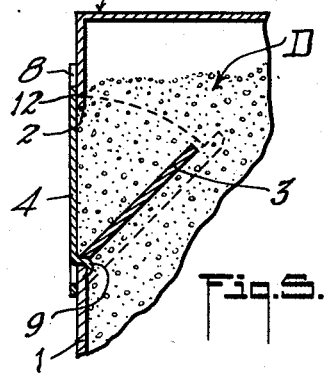
Figure 5 is a view similar to Figure 3 showing the spout filled with the container contents preparatory to opening the spout for the discharge of a measured quantity of said contents.

In applying the spout to the container, the side walls 5 are slipped through the slots formed between the side edges of the aperture and the edges of the tongue 3, and the spout is then placed over the tongue with the body portion overlying the outer face of the tongue and the side walls 5 engaging the side edges of the aperture 2. The body portion 4 is then secured to the tongue by forcing the prongs through the tongue and clinching them as shown in Figures 2, 4 and 5 to positively connect the tongue and the spout together and prevent relative movement or displacement thereof. When the tongue and spout are swung inwardly until the extension 8 of the body portion lies flat against the wall 1, the aperture 2 is closed, the side walls 5 seal the edges thereof by friction and the extension 8 engages the wall to seal the corresponding end of the aperture and at the same time serves as a stop to limit further movement of the spout in a closing direction.

Preferably the tongue 3 is so formed that a portion 12 of the wall of the container opposite the hinged end of the aperture at which the spout is hinged, is disposed between the side walls 5 to hold said walls apart and in frictional engagement with the side edges of the aperture.

Figure 8:
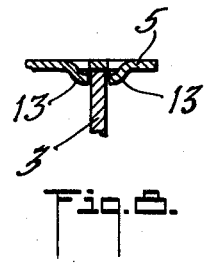
Figure 8 is an enlarged fragmentary sectional view approximately on the plane of the line 8—8 of Figure 3.

In accordance with the invention, the tongue 3 comprises a part of the spout to form a measuring pocket C for discharging measured quantities of the contents D of the container. As shown, the tongue 3 is bent out of the general plane of the wall 1 of the container and has its free end connected to the side walls or flanges 5 of the spout as shown in Figures 2, 3 and 4. Various forms of connection between the tongue and the spout may be utilized but preferably and inexpensively each flange 5 may have portions 13 stamped or pressed inwardly thereof in spaced relation to each other to serve as abutments for and to receive between them the corresponding edge portion of the tongue 3 as shown in Figures 3 and 8. After the body portion of the spout has been connected to the container wall, the tongue 3 may be swung inwardly of the container and its edges may be snapped into position between the corresponding abutments 13. Thereafter, the tongue 3 will swing with the body portion and wings of the spout between the open and closed positions of the spout as shown in Figures 3 and 4.

Figure 6:
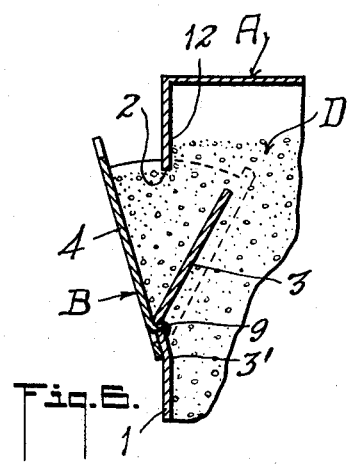
Figure 6 is a view similar to Figure 5 showing the spout in partially open or discharging position.
Figure 7:
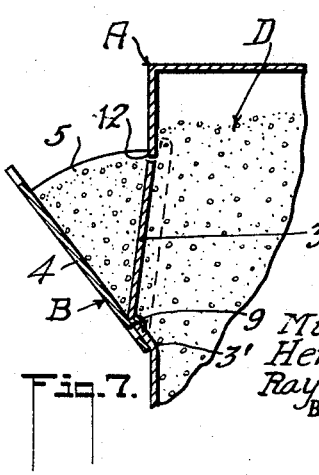
Figure 7 is a similar view showing the spout in completely open or discharging position.

In use of the invention, when it is desired to dispense or discharge a predetermined quantity of the contents of the container, the container will be tilted or turned upside down so as to cause some of the contents thereof to flow into the measuring pocket C as shown in Figure 5, whereupon the spout will be pulled into open or discharge position as shown in Figures 6 and 7. It will be observed that as the spout moves from the closed position to its open position, the edge of the portion 12 of the container wall will serve as a scraper to level off the container contents in the measuring pocket and limit the flow of the container contents into the pocket and thereby insure that only a predetermined quantity of the contents shall be deposited in the pocket. After the spout has been moved to its open or discharge position as shown in Figure 7, the container and spout can be tilted in such a way as to cause the container contents to flow by gravity out of the measuring pocket in the spout after which the spout can be pushed back into the container to close the discharge aperture as shown in Figure 3.

Figure 9:
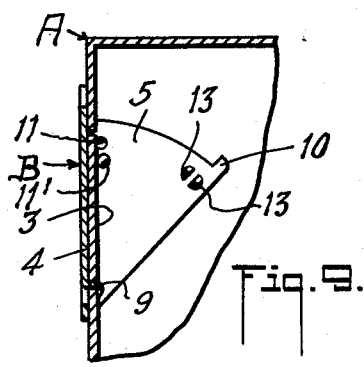
Figure 9 is a view similar to Figure 3 showing the spout adapted for pouring of the container contents.
Figure 10:
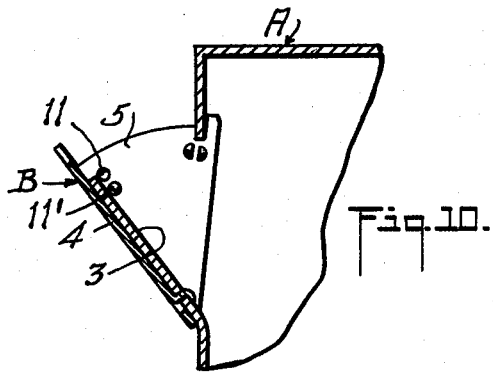
Figure 10 is a view similar to Figure 4 showing the spout of Figure 9 in completely open or pouring position.
Figure 11:
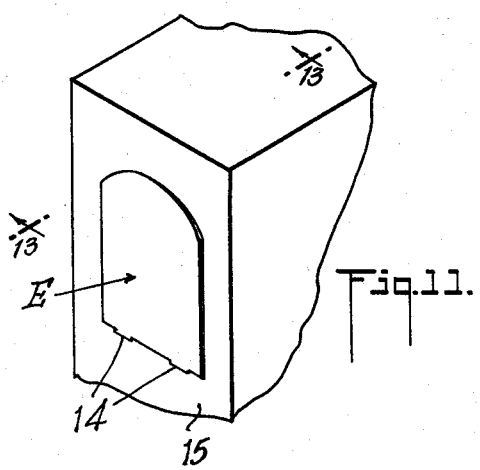
Figure 11 is a view similar to Figure 1 showing a modification of the spout and its attachment to the container.
Figure 12:
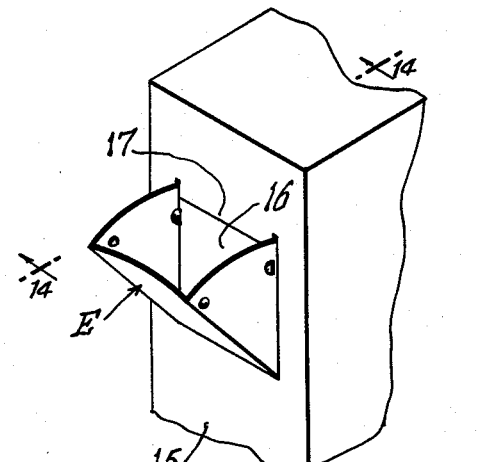
Figure 12 is a view similar to Figure 2 showing the modified spout of Figure 11.

Figures 9 and 10 show the spout adapted for pouring the container contents through the discharge opening in a continuous stream instead of discharging the container contents in measuring quantities. Here the tongue 3 is disconnected from the abutments 13 and swung forwardly into flatwise abutting relation to the body portion 4 of the spout so that the contents of the container can freely flow outwardly of the discharge aperture and over the tongue 3 from the spout; desirably inwardly extending protuberances 11' are provided on the side walls 5 to receive between them and the body portion the corresponding edge portions of the tongue 3 to hold the tongue in said position.

Figure 13:
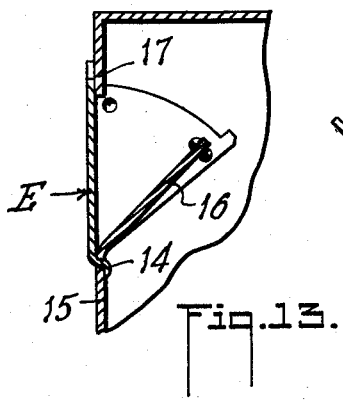
Figure 13 is a vertical sectional view on the plane of the line 13—13 of Figure 11.
Figure 14:
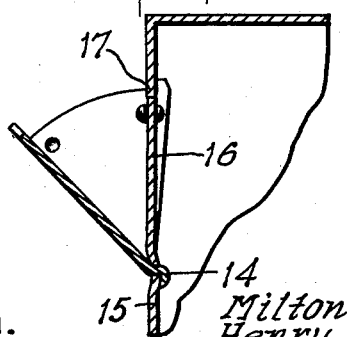
Figure 14 is a vertical sectional view on the plane of the line 14—14 of Figure 12.

Figures 11 to 14 inclusive show a modification of the invention in which the spout is connected to the container in a different manner. Here the prongs project from the end of the body portion of the spout E instead of from the body portion at points in spaced relation to said end and the spout swings about the prongs 14 as hinges in contrast to the swinging or bending of the tongue in the form of the invention shown in Figures 1 to 10 inclusive. The prongs penetrate the wall 15 of the container and are then curvedly bent along the inside of said wall as best shown in Figures 13 and 14 so that the prongs may swing in the apertures formed by them in the container wall. This form of the invention permits the body portion of the spout to be made smaller and also permits the free end of the tongue 16, which corresponds to the tongue 3, to snugly engage the edge of the portion 17 of the container wall, corresponding to the portion 12, that is disposed between the flanges or side walls of the spout, as shown in Figure 14, thereby positively preventing the contents of the container from escaping between the tongue and the portion 17 when the container contents are being discharged from the spout, as shown in Figure 14.

It will be observed that in all forms of the invention, the spout comprises a plurality of wall portions 3, 4 and 5, and that one of said wall portions, i.e., the tongue 3, comprises a part of the container wall that is displaced to form the discharge aperture.

Other modifications in the form of the spout and of its connection to the container will occur to those skilled in the art as within the spirit and scope of the invention. For example, the spout might be hinged to the container wall by a pivot pin or staple as shown in Patent No. 1,599,536 and the shape of the spout and the shape of the tongue in the container wall may be varied.

We claim:
1. The combination of a container having a substantially rectangular discharge aperture in one wall thereof, and a tongue that comprises the part of said wall that was displaced to form said aperture and is integrally hingedly connected at one end to said wall at one end of the aperture for swinging movement into and out of said aperture and has a free end edge and opposite side edges, a spout comprising a body portion overlying the outer side of said tongue hingedly connected at one end to said wall adjacent the hinging of said tongue to open and close said aperture and with one end portion adapted to project beyond said free end edge of said tongue and the other end of said aperture for engagement with said wall in the closed position of the spout to limit closing movement of the spout and to seal said outer end of said aperture, sector-shaped side walls on said body portion having their outer faces frictionally engaging the side edges of said aperture to seal said edges in the closed position of said spout and whose arcuate edges are concentric with said axis of hinging of said body portion with free space between them, said tongue being disposed in said free space between said side walls with each of its opposite side edges in abutting relation to one side wall, and means connecting said tongue to said side walls in angular relation to said body portion with the free end of the tongue in spaced relation to said body portion, thereby providing a measuring pocket whose walls constitute said tongue, said side walls and said body portion of the spout.

2. The combination of a container having a substantially rectangular discharge aperture in one wall thereof, and a tongue that comprises the part of said wall that was displaced to form said aperture and is integrally hingedly connected at one end to said wall at one end of the aperture for swinging movement into and out of said aperture and has a free end edge and opposite side edges, a spout comprising a body portion overlying the outer side of said tongue hingedly connected at one end to said wall adjacent the hinging of said tongue to open and close said aperture and with one end portion adapted to project beyond said free end edge of said tongue and the other end of said aperture for engagement with said wall in the closed position of the spout to limit closing movement of the spout and to seal said outer end of said aperture, sector-shaped side walls on said body portion having their outer faces frictionally engaging the side edges of said aperture to seal said edges in the closed position of said spout and whose arcuate edges are concentric with said axis of hinging of said body portion with free space between them, said tongue being disposed in said free space between said side walls with each of its opposite side edges in relatively slidable abutting relation to one side wall, and means releasably connecting said tongue to said side walls in angular relation to said body portion with the free end of the tongue in spaced relation to said body portion, thereby providing a measuring pocket whose walls constitute said tongue, said side walls and said body portion of the spout, and means to releasably connect said tongue to said side walls in flatwise abutting relation to said body portion of the spout, whereby said tongue selectively may be disposed in angular relation to said body portion of the spout to provide a measuring pocket or may be held in flatwise abutting relation to said body portion to provide for pouring of a continuous stream of the package contents through the spout.

References Cited in the file of this patent

UNITED STATES PATENTS

| | | |
|---|---|---|
| 1,411,000 | Condon | Mar. 28, 1922 |
| 1,619,315 | Rickets | Mar. 1, 1927 |
| 1,710,119 | Smith | Apr. 23, 1929 |
| 1,752,527 | Howard | Apr. 1, 1930 |
| 2,019,406 | Garfein | Oct. 29, 1935 |
| 2,069,281 | Sebreny | Feb. 2, 1937 |
| 2,610,770 | Penfield | Sept. 16, 1952 |
| 2,672,261 | Des Rosiers | Mar. 16, 1954 |